W. B. SCHORTMAN.
CHANGEABLE SPEED GEARING.
APPLICATION FILED MAY 10, 1913.
1,083,863.
Patented Jan. 6, 1914.
3 SHEETS—SHEET 1.
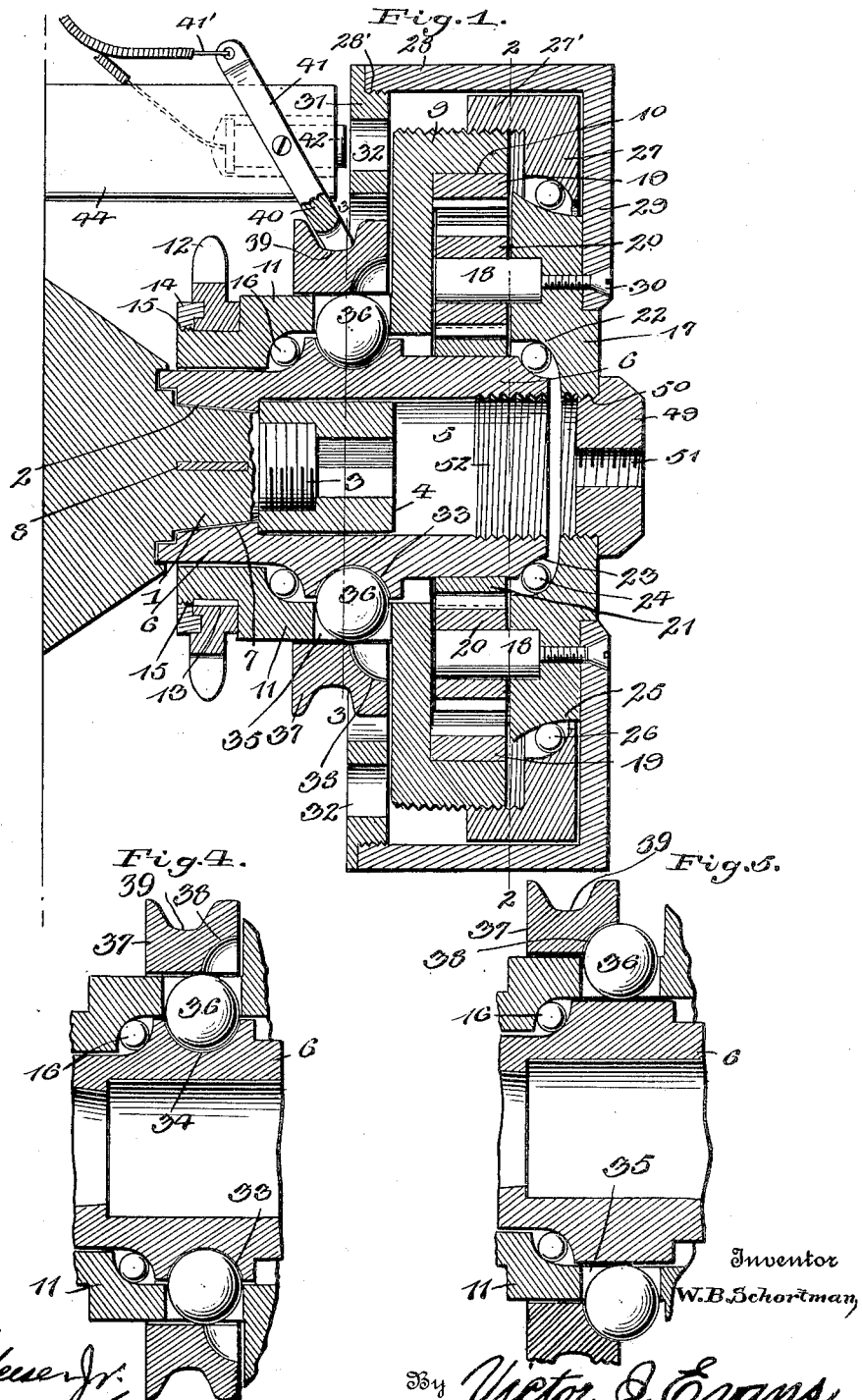

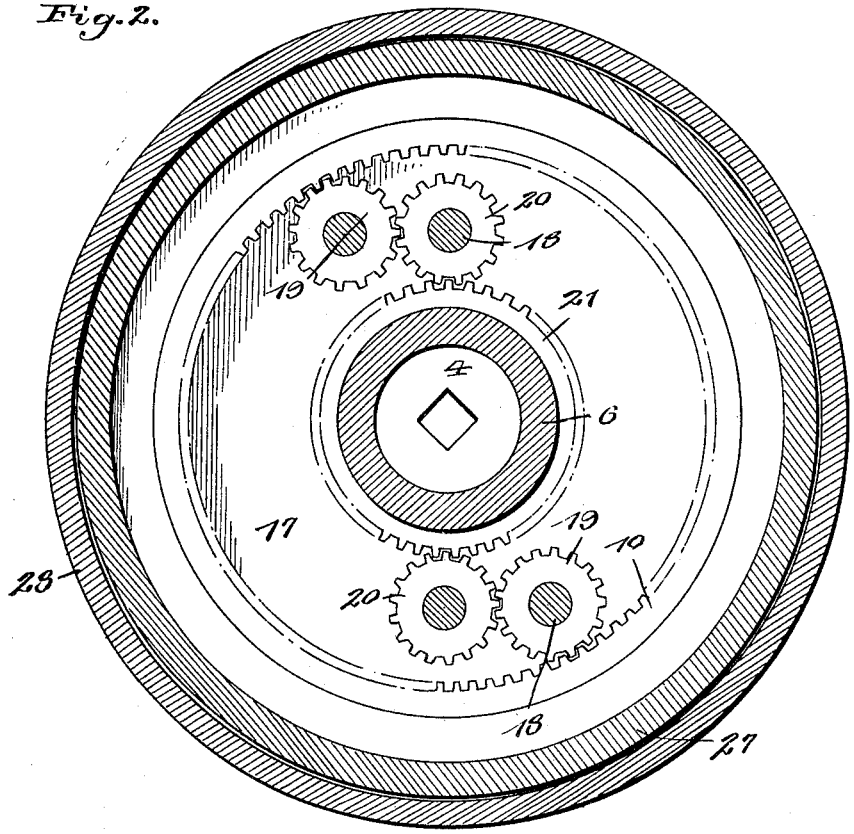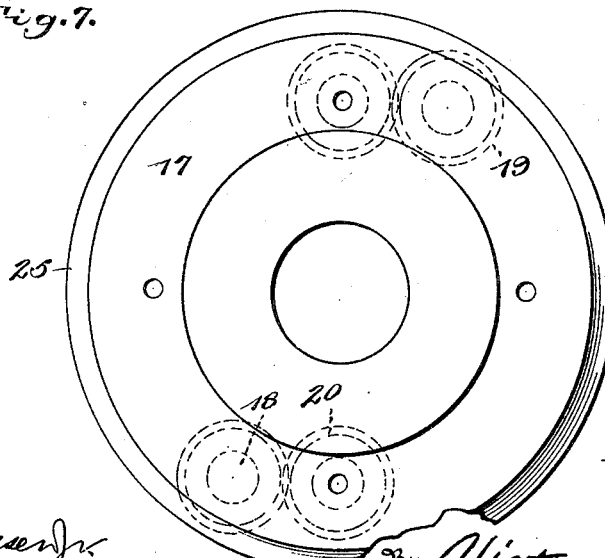

W. B. SCHORTMAN.
CHANGEABLE SPEED GEARING.
APPLICATION FILED MAY 10, 1913.

1,083,863.

Patented Jan. 6, 1914.

3 SHEETS—SHEET 3.

Witnesses

Inventor
W. B. Schortman

By Victor J. Evans
Attorney

COLUMBIA PLANOGRAPH CO., WASHINGTON, D. C.

UNITED STATES PATENT OFFICE.

WILLIAM B. SCHORTMAN, OF PORTERSVILLE, CALIFORNIA.

CHANGEABLE-SPEED GEARING.

1,083,863.     Specification of Letters Patent.     Patented Jan. 6, 1914.

Application filed May 10, 1913. Serial No. 766,819.

*To all whom it may concern:*

Be it known that I, WILLIAM B. SCHORTMAN, a citizen of the United States, residing at Portersville, in the county of Tulare and State of California, have invented new and useful Improvements in Changeable-Speed Gearing, of which the following is a specification.

This invention relates to changeable speed gearing, especially adapted for motorcycles, whereby two speeds are provided, high speed for ordinary road work, and low speed for work on hills or steep grades and sandy stretches, or in fact in almost any place where a single geared motorcycle has trouble.

A further object of the invention is to provide a changeable speed gearing which may be readily applied to any ordinary motorcycle provided with a free engine clutch on the countershaft.

A further object of the invention is to provide a construction which will reduce the number of parts to a minimum, and at the same time minimize the friction of the working parts, so as not to impose any extra load on the engine; also means for readily shifting the clutch from high to low gear, and vice-versa, within reach of the operator of the motorcycle.

With the above and other objects in view, the invention consists in the construction, combination and arrangement of parts, which will be hereinafter more fully described, illustrated in the accompanying drawings, and pointed out in the claims hereunto appended.

Figure 3:
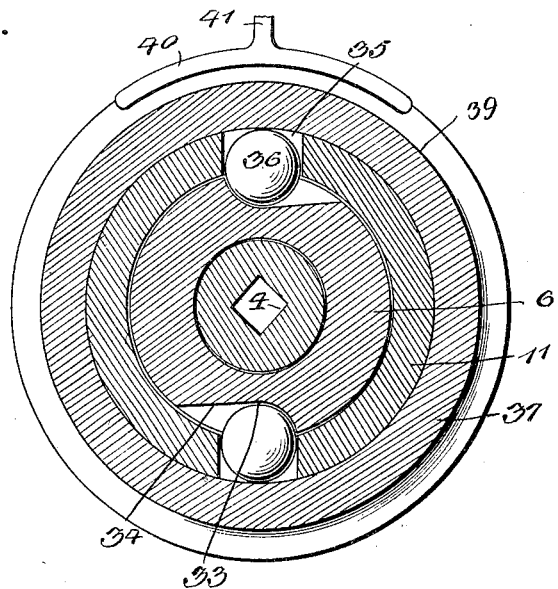
Figure 6:
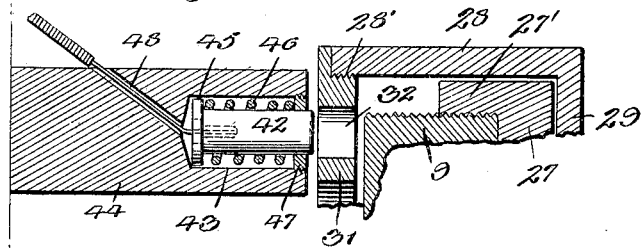
Figure 8:
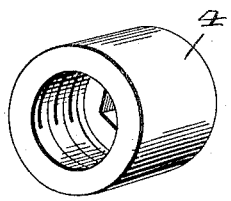

In the accompanying drawings:—Figure 1 is a diametrical section through the changeable speed gearing of this invention, showing the clutch ring in its clutching position. Fig. 2 is a vertical section on the line 2—2 of Fig. 1. Fig. 3 is a vertical section on the line 3—3 of Fig. 1. Figs. 4 and 5 are detail sections showing the clutch ring in and out, respectively. Fig. 6 is a detail section showing the locking device for fastening the internal gear and yoke ring against relative rotation. Fig. 7 is an outside face view of the pinion carrier. Fig. 8 is a detail perspective view of the internal nut.

Referring to the drawings, 1 designates the engine shaft of a motorcycle, the same being beveled, adjacent to its extremity, as shown at 2, and provided with a reduced and threaded end 3 which is shaped to receive a lock nut 4 contained within the bore 5 of a hollow shaft 6 which forms an extension of the engine shaft 1, as shown in Fig. 1. The hollow shaft 6 is beveled, as shown at 7, to fit the beveled portion 2 of the engine shaft, and both shafts are recessed to receive a key 8 to avoid any possibility of relative rotative movement between the two shafts. When the nut 4 is screwed tightly upon the threaded portion 3 of the engine shaft, the extension shaft 6 is securely locked to the engine shaft and always rotates therewith.

9 designates an internal gear which is provided with an internally toothed rim 10, and a sleeve-like hub or extension 11 which loosely surrounds the shaft 6, as shown in Fig. 1. A sprocket wheel 12 is keyed to the hub 11, as shown at 13, and held in place by a retaining locking ring 14 threaded on the end of the hub, as shown at 15. At this end of the hub 11 and shaft 6, ball races are provided, in which is arranged a circular series of anti-friction balls 16 forming a ball bearing at the inner end of the hub 11. At the opposite end of the extension shaft 6 is a disk shaped pinion carrier 17 provided on its inner face with journals 18, on which are mounted pinions 19 and 20, two sets of such pinions being shown in Fig. 2, the pinions 19 meshing with the teeth of the internally toothed rim 10, while the pinions 20 mesh with the teeth of a spur gear wheel 21 keyed to or otherwise fast upon the shaft 6, near the outer end thereof. The pinion carrier 17 is provided with a ball-race 22, and the adjacent end of the shaft has a ball race 23, so as to provide for an annular ball bearing 24 at that end of the axle. The pinion carrier 17 is concaved in its outer face, as shown at 25, to receive an annular ball bearing 26 the balls of which are confined between the concave face of the carrier 17 and an annular bearing having a lateral flange 27 or rim 27' which is threaded on the outer periphery of the internal gear 9. A yoke ring 28 embraces the internal gear 9 and the pinion carrier 17 and is formed with a flange 29 extending inwardly from its outer edge and fastened to the pinion carrier 17 by screws 30 or their equivalent. At its inner edge the ring 28 has a locking annulus 31 provided with holes 32, secured in fixed relation thereto, as shown in Fig. 1, where it will be noted the annulus is rabbeted and screwed into the ring 28, the latter being internally threaded at 28' for the purpose. The shaft 6 is provided at diametrically opposite points with recesses 33 having concaved tangential floors 34. The hub or sleeve 11 is provided at diametrically opposite points with openings 35 extending through the same, and in said openings are placed oppositely arranged clutch balls 36 which work against the flat floors 34 of the recesses 33.

Surrounding the sleeve or hub 11 is a clutch ring 37 which is adapted to be shifted lengthwise of the hub, said clutch ring being rabbeted in one side, as shown at 38, so as to provide the necessary clearance for the balls 36, as they move outwardly, and also to coöperate with said balls for the purpose of urging the same inwardly into the recesses 33, when the clutch ring 37 is moved outwardly or away from the sprocket wheel 12. In order to shift the ring 37, said ring is provided in its periphery with a groove 39 adapted to receive the forked arm 40 of a clutch shifting lever 41 having attached thereto an operating connection 41' arranged within convenient reach of the operator of the motorcycle.

In order to lock the pinion carrier 17, I provide a locking pin 42 which is slidable in the direction of its length in a recess 43 in a fixed part of the frame, said pin being best illustrated in Fig. 6 and being adapted to enter one or the other of the holes 32 in the annulus 31. As the annulus 31 bears a fixed relation to the yoke ring 28 and the latter bears a fixed relation to the pinion carrier 17, it will thus be seen that the pinion carrier is held stationary while the internal gear 9 revolves, driving the hub 6 through the medium of the pinions 19 and 20. The lock pin 42 is normally held out of engagement with the annulus 31 by the coiled expansion spring 46 which encircles the pin and is confined between a head 45 at the inner end of the pin and a spring seat or bushing 47 which is screwed into the outer end of the recess 43 as shown in Fig. 6.

48 designates an operating connection for drawing the pin 42 out of locking position, said operating connection extending to a point within reach of the operator.

When the pinion carrier 17 is unlocked, it turns with the rest of the gearing, and the pinions 19 and 20 while still intermeshing with the spur gear wheel 21 and the internal gear are swept around the axis of movement of the changeable speed gear as a whole.

When the clutch ring is in the position illustrated in Fig. 4, the mechanism is in high speed position, the sprocket wheel 12 being driven at the same rate of speed as the engine shaft 1. When the clutch ring 37 is shifted to the position shown in Fig. 5, the balls 36 are permitted to move outwardly, thereby relieving the clutched engagement between the hub and shaft and throwing the mechanism into low speed position, in which the hub or sleeve 11 and the sprocket 12 will be driven approximately at one-half the speed of the engine shaft.

The inner end of the lock nut 4 is internally threaded, as above stated, to engage the threaded portion 3 of the engine shaft. The outer end of said nut 4 is provided with a square socket 51 to receive a wrench, by means of which the nut 4 may be loosened and tightened.

49 designates a cap or plug which is threaded at 50 into an internally threaded opening in the center of the pinion carrier 17 as shown in Fig. 1, said cap or plug having an internally threaded bore 51 through which a jack screw (not shown) is adapted to be inserted so as to bear against the end of the axle 1 for the purpose of pulling the two-speed gearing off the axle. In order to do this, the pinion carrier 17 is first removed, after which the cap or plug 49 is removed from the pinion carrier and screwed into the end of the hollow shaft which is internally threaded as shown at 52 to receive said cap or plug. A threaded rod or bolt is then inserted through the threaded bore 51 of the plug and turned until it bears against the end of the axle 1; then upon a further turning of said screw the two-speed gearing as a whole is forced off the end of the axle, the nut 4 having of course been previously removed.

When shifting from high to low speed the clutch ring must be moved first and after it is disengaged so as to release the clutch, the locking pin 42 is pushed inwardly into locking position. To change to high speed, the pin 42 must first be moved outwardly to the position shown in Fig. 6 after which the clutch ring is shifted into clutching position.

The changeable speed gearing hereinabove particularly described will be found of great advantage on steep hills or along sandy stretches, or in fact in any place where a single geared motorcycle has trouble. There are no sliding clutches and the like to stick, break and wear out, and there are no shifting gears, all of the gears referred to being in constant mesh; therefore, there is no danger of the teeth becoming broken or stripped, as in the case of gears that are being constantly shifted into and out of engagement with each other. Furthermore, the entire gearing may be packed in hard oil to insure ample lubrication at all points. The changeable speed gearing as a whole embodies no springs or other delicate parts which are liable to become broken, and the drive instead of being by sprocket chain extending back to the drive wheel of the motorcycle, as hereinabove indicated, may be by belt, shaft, or any other power transmitting means.

It will be observed that by reason of the particular construction and relative arrangement and combination of parts as hereinabove described and clearly illustrated in the drawings, a practically dust and dirt proof two-speed gearing is provided, particularly adapted for use on motorcycles which are subjected to frequent falls due to reckless riding and carelessness in finding a suitable support for the motorcycle when not in use. It thereby becomes important to protect the working parts of the two-speed gearing from the admission of dirt, dust and other foreign matter.

What is claimed is:

1. The combination with the frame and engine shaft of a motorcycle, of changeable speed gearing embodying a shaft rotating with and forming an extension of the engine shaft, an internal gear having a cylindrical hub loosely surrounding said extension shaft and provided with diametrically opposite openings, clutch balls loose in said openings, a clutch ring encircling said hub and shiftable lengthwise thereof to hold the balls in clutching engagement with the extension shaft or release the same from such engagement, a spur gear wheel on said extension shaft, a pinion carrier, pinions journaled on said carrier meshing with said spur gear wheel and internal gear, means for locking said carrier against rotation and unlocking the same, and means for shifting said clutch ring.

2. The combination with the frame and engine shaft of a motorcycle, of changeable speed gearing embodying a hollow shaft rotating with and forming an extension of the engine shaft, a nut within said hollow shaft for locking the extension shaft to the engine shaft, an internal gear having a cylindrical hub loosely surrounding said extension shaft and provided with diametrically opposite openings, clutch balls loose in said openings, a clutch ring encircling said hub and shiftable lengthwise thereof to hold the balls in clutching engagement with the extension shaft or release the same from such engagement, a spur gear wheel on said extension shaft, a pinion carrier, pinions journaled on said carrier meshing with said spur gear wheel and internal gear, means for locking said carrier against rotation and unlocking the same, and means for shifting said clutch ring.

3. The combination with the frame and engine shaft of a motorcycle, of changeable speed gearing embodying a hollow shaft rotating with and forming an extension of the engine shaft, a socket nut within said hollow shaft for locking the extension shaft to the engine shaft, an internal gear having a cylindrical hub loosely surrounding said extension shaft and provided with diametrically opposite openings, clutch balls loose in said openings, a clutch ring encircling said hub and shiftable lengthwise thereof to hold the balls in clutching engagement with the extension shaft or release the same from such engagement, a spur gear wheel on said extension shaft, a pinion carrier, pinions journaled on said carrier meshing with said spur gear wheel and internal gear, means for locking said carrier against rotation and unlocking the same, and means for shifting said clutch ring.

4. The combination with the frame and engine shaft of a motorcycle, of changeable speed gearing embodying a hollow shaft rotating with and forming an extension of the engine shaft, a nut within said hollow shaft for locking the extension shaft to the engine shaft, said nut having one threaded portion to engage the engine shaft and a square socketed portion to receive a wrench, an internal gear having a cylindrical hub loosely surrounding said extension shaft and provided with diametrically opposite openings, clutch balls loose in said openings, a clutch ring encircling said hub and shiftable lengthwise thereof to hold the balls in clutching engagement with the extension shaft or release the same from such engagement, a spur gear wheel on said extension shaft, a pinion carrier, pinions journaled on said carrier meshing with said spur gear wheel and internal gear, means for locking said carrier against rotation and unlocking the same, and means for shifting said clutch ring.

5. The combination with the frame and engine shaft of a motorcycle, of changeable speed gearing embodying a shaft rotating with and forming an extension of the engine shaft, an internal gear having a cylindrical hub loosely surrounding said extension shaft and provided with diametrically opposite openings, clutch balls loose in said openings, a clutch ring encircling said hub and shiftable lengthwise thereof to hold the balls in clutching engagement with the extension shaft or release the same from such engagement, said clutch ring being internally rabbeted to coöperate with the clutch balls, a spur gear wheel on said extension shaft, a pinion carrier, pinions journaled on said carrier meshing with said spur gear wheel and internal gear, means for locking said carrier against rotation and unlocking the same, and means for shifting said clutch ring.

6. The combination with the frame and engine shaft of a motorcycle, of changeable speed gearing embodying a shaft rotating with and forming an extension of the engine shaft, an internal gear having a cylindrical hub loosely surrounding said extension shaft and provided with diametrically opposite openings, clutch balls loose in said openings, a clutch ring encircling said hub and shiftable lengthwise thereof to hold the balls in clutching engagement with the extension shaft or release the same from such engagement, a spur gear wheel on said extension shaft, a pinion carrier, pinions journaled on said carrier meshing with said spur gear wheel and internal gear, a shiftable non-rotating locking device for said pinion carrier, and means for independently shifting said clutch ring and locking device.

In testimony whereof I affix my signature in presence of two witnesses.

WILLIAM B. SCHORTMAN.

Witnesses:
 J. T. COBB,
 GERAH R. LUMLEY.

Copies of this patent may be obtained for five cents each, by addressing the "Commissioner of Patents, Washington, D. C."